(12) United States Patent
Engel

(10) Patent No.: US 8,896,561 B1
(45) Date of Patent: Nov. 25, 2014

(54) METHOD FOR MAKING PRECISE GESTURES WITH TOUCH DEVICES

(71) Applicant: Keysight Technologies, Inc., Minneapolis, MN (US)

(72) Inventor: Glenn R. Engel, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 5 days.

(21) Appl. No.: 13/851,905

(22) Filed: Mar. 27, 2013

(51) Int. Cl.
*G09G 5/00* (2006.01)
*G06F 3/041* (2006.01)

(52) U.S. Cl.
CPC ................................. *G06F 3/041* (2013.01)
USPC ..................... 345/173; 715/863; 178/18.03

(58) Field of Classification Search
CPC ....... G06F 3/017; G06F 3/041; G06F 3/0484; G06F 3/04842; G06F 3/04845; G06F 3/0485; G06F 3/0486; G06F 3/0488; G06F 3/04883; G06F 2203/04808
USPC .......... 345/169, 173, 684; 715/863, 864, 784; 178/18.03
See application file for complete search history.

(56) References Cited

U.S. PATENT DOCUMENTS

| | | | |
|---|---|---|---|
| 8,749,494 B1 * | 6/2014 | Delker et al. | 345/173 |
| 2011/0118026 A1 * | 5/2011 | Lukas et al. | 463/37 |
| 2012/0162093 A1 * | 6/2012 | Buxton et al. | 345/173 |
| 2013/0106730 A1 * | 5/2013 | Ohta | 345/173 |

* cited by examiner

*Primary Examiner* — Tom Sheng

(57) ABSTRACT

A method for operating a data processing system to implement a gesture on a touch enabled display is disclosed. The method causes the data processing system to determine a position of a contact object on the touch-enabled display as a function of time. The data processing system provides an offset indicating a distance through which a point shown on the display is to be moved in response to the determined position. The offset has a first value in a normal mode and a second value in a precise gesture mode. The value in the precise gesture mode is less than the value in the normal mode. The data processing system automatically changes from the normal mode to the precise gesture mode in response to changes in the determined position as a function of time. Exemplary changes utilize changes in direction or the speed of motion of the contact object.

18 Claims, 3 Drawing Sheets

METHOD FOR MAKING PRECISE GESTURES WITH TOUCH DEVICES

BACKGROUND

Touch screen devices are used in many classes of data processing systems such as smart phones, tablets, or conventional computers. Data processing systems that are part of measurement instruments are now utilizing such touch screens. However, in the case of these instruments, the touch gestures often do not have the required precision.

Most uses of touch screen devices do not require precise motion control, and hence, the lack of precision is not a major problem in these devices. For example, scrolling through a list, choosing an item, swiping from one screen to another are all touch gestures that do not require a high degree of precision.

When using touch devices to view instrumentation data users often require more precise gestures. For example, the user often wants to move markers or adjust the X or Y axis position of a trace very precisely on an oscilloscope. The accuracy of a touch gesture is limited by the size of the user's finger. The human finger is quite large in relation to the movement desired to precisely locate a marker. As such, it becomes difficult to position the marker to a specific pixel location with any accuracy. A user may get "almost there" and then overshoot significantly as friction causes their finger to move more quickly than they wish. In addition, the area covered by a finger is many pixels wide and getting an accurate placement is difficult.

Prior solutions to this problem utilize a special "mode" for precise gestures, requiring the user to select a fine or coarse selection. Switching between modes complicates the interaction with the touch screen and breaks the user's chain of thought.

SUMMARY

The present invention includes a method for operating a data processing system to implement a gesture on a touch enabled display. The method causes the data processing system to determine a position of a contact object on the touch-enabled display as a function of time. The data processing system provides an offset indicating a distance through which a point shown on the display is to be moved in response to the determined position. The offset has a first value in a normal mode and a second value in a precise gesture mode. The value in the precise gesture mode is less than the value in the normal mode. The data processing system automatically changes from the normal mode to the precise gesture mode in response to changes in the determined position as a function of time.

In one aspect of the invention, the data processing system determines a speed with which the contact object is moving on the touch-enabled display, and the data processing system changes to the precise gesture mode if the speed is less than or equal to a slow threshold value. In another aspect, the data processing system determines a direction of motion of the contact object on the touch-enabled display as a function of time, and the data processing system changes to the precise gesture mode if the direction of motion changes more than a predetermined number of times within a predetermined time period. The data processing system changes to the normal mode when a gesture executed in the precise gesture mode terminates.

In another aspect of the invention, the data processing system changes from the precise gesture mode to the normal mode if the determined speed is greater than a predetermined reset value.

In a still further aspect of the invention, the determined position depends on an average value of a speed of the contact object over a plurality of previous determined positions. In one embodiment, the average value is an exponential average of previous speeds of the contact object.

DETAILED DESCRIPTION

In the present invention, the data processing system detects raw motion events from a touch point and then processes these to provide a smoothed motion event that averages out the changes in motion caused by the friction between the user's finger and the screen. In addition, the present invention monitors the speed of the motion to determine if the gesture being executed requires a higher degree of precision. Such gestures will be referred to as precise gestures in the following discussion. When the data processing system detects a precise gesture, the user's actions are scaled by a predetermined factor so that the user must move his or her finger further on the screen to execute a motion of a given magnitude. For example, in a precise gesture, the user might need to move his or her finger 1 inch to cause the selected point to move a quarter of an inch.

Figure 1A:
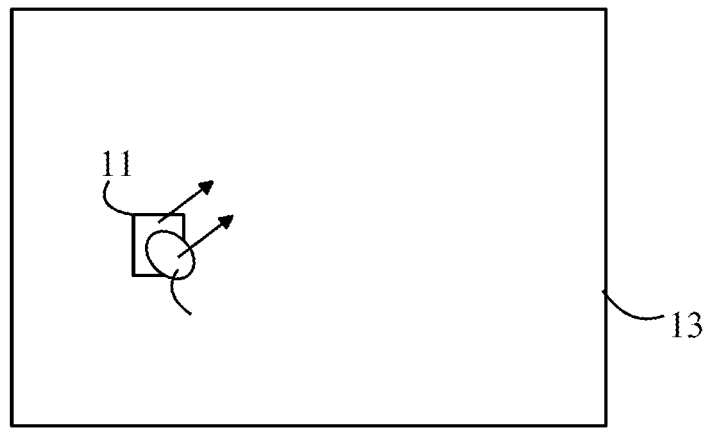
FIG. 1A illustrates a "drag" gesture in normal mode.

Refer now to FIG. 1A which illustrates a "drag" gesture in normal mode. In FIG. 1A, an object 11 on the display of a data processing system is moved by touching the object with finger 12 and moving finger 12 while finger 12 remains in contact with the display. To simplify the discussion, the data processing system is not shown separately in the drawings; however, it is to be understood that display 13 includes a data processor. To simplify the following discussion, the position of the user's finger on the display relative to some coordinate system on the display will be referred to as the "raw coordinates" of the finger. The position of the object being manipulated on the screen by the gesture will be referred to as the object coordinates. In normal operation, these two sets of coordinates are the same. That is, the user selects object 11 by touching that object and then moves the selected object by moving his or her finger. The object moves with the finger and remains under the finger. The velocities of object 11 and finger 12 remain the same as indicated by the arrows in the figure.

In some gestures, the relevant coordinates are those of two fingers. For example, in a pinch zoom, the distance between the two fingers determines the change in scale on the display. There may also be an "object location" associated with the gesture, namely the half-way point between the fingers that determines the center of the display after the zoom.

Figure 1B:
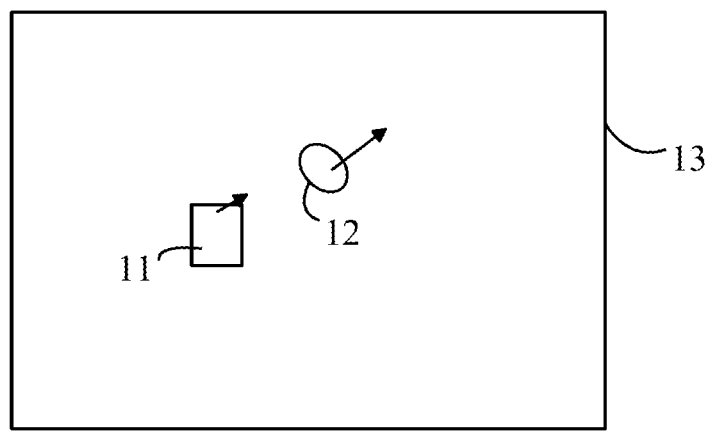
FIG. 1B illustrates the drag operation depicted in FIG. 1A in precise gesture mode.

Refer now to FIG. 1B, which illustrates the drag operation depicted in FIG. 1A in precise gesture mode. In a precise gesture, the position of the user's finger in these two coordinate systems is different. As the user drags the object, the object moves in the same direction as the user's finger 12, but at a slower speed as indicated by the difference in length of the two arrows shown in the figure. As a result, the finger moves away from the object that is the subject of the drag operation. In this mode, when the user moves his or her finger a distance characterized by a vector D, the object moves a distance characterized by a vector D/4. Hence, the location of the user's finger no longer matches location of the object being moved. This difference in location is normally not important, since the user is looking at the object and positioning the object relative to some other object in the display. For example, in positioning a trace on an oscilloscope display for comparison with another trace, the user typically drags one of the cases to a position at which it is aligned with some feature of the other trace or a reticule on the display. The user is watching the distance between the trace and the alignment point during the drag operation. If anything, having the finger separated from the object by some distance improves the user's view of the positioning.

Once the object is positioned, the user causes the system to exit precise gesture mode. At this point, the data processing system knows that the object and the user's finger are currently separated by a vector P. The data processing system maintains this vector separation during the non-precise gesture operations. This aspect of the present invention provides a smooth transition between precise gesture mode and normal mode.

To execute precise gesture mode, the user must be able to signal the data processing system that it is to enter and exit precise gesture mode. In one aspect of the present invention, the data processing system uses the speed at which the user's finger is moving on the screen to detect whether the user wishes to enter precise gesture mode. Ideally, the data processing system detects the user's intention to enter precise gesture mode without the user having to select the mode from a menu or some other separate signaling mechanism. In a drag operation, the user will normally reduce the speed of motion as the user approaches the desired position. Hence, a triggering mechanism that switches to precise gesture mode when the speed of the finger is less than some predetermined slow threshold is advantageous. Similarly, if the direction of motion of the user's fingers changes by some predetermined period of time while remaining in the same general location on the screen, the user may be trying to precisely position the object, but is overshooting the desired position on each attempt. Hence, a triggering mechanism that switches to precise gesture mode when the direction of motion changes more than some predetermined number of times while remaining in the same general location on the screen is advantageous.

Similarly, it is advantageous to have the data processing system exit precise gesture mode based on the user's behavior rather than the selection of a mode change from a menu or similar separate selection operation. In one aspect of the invention, the data processing system exits precise gesture mode when the user ends the gesture. That is, all gestures start in normal mode. Accordingly, when the user lifts the user's finger at the end of a drag operation in which the data processing system was in precise gesture mode, the data processing system returns to normal mode. In another aspect of the invention, the data processing system exits precise gesture mode when the speed with which the user's finger is moving on the screen exceeds an exit speed threshold. While it is advantageous to have the data processing system "read the user's mind" in entering and exiting from precise gesture mode, systems in which some separate entry or exit operation, such as mode selection from a menu, can be constructed without departing from the teaching of the present invention.

As noted above, friction between the user's finger and the display screen during a gesture can give rise to "jerky" motion. This irregular motion interferes with precise positioning of the object on the screen. In addition, the changes in speed associated with such motion could result in the data processing system entering or leaving precise gesture mode when the user did not want such a mode change. Hence, it is advantageous to provide some form of averaging, particularly when determining the speed of motion of the user's finger. In one aspect of the present invention, the speed of the user's finger is computed from an exponential moving average. In this aspect of the present invention, the data processing system updates an average speed for the user's finger each time a new finger position measurement is made. Denote the current average velocity by the vector, V, and denote the newly acquired velocity by v. Then the new average velocity is given by $(1-W)*V+W*v$, where W is a predetermined weighting factor. This form of moving average has the advantage of only requiring the data processing system to maintain one "historical" velocity point, i.e., V. When the direction of motion changes, the running average is restarted.

During the startup phase after a direction change, the value of W is adjusted so that an approximation of the new average will be immediately available. When the first new point is obtained, W is set to 1. When the next point is obtained, W is set to ½, and so on, until W is equal 1/n, where n is the number of points to be used in the remainder of the averaging. In one aspect of the invention, n=4.

Hence, the average value will not be valid for the first few new position points. While this form of moving average is preferred, embodiments in which other forms of position, or velocity, averaging are used can also be constructed without departing from the teachings of the present invention.

Figure 2:
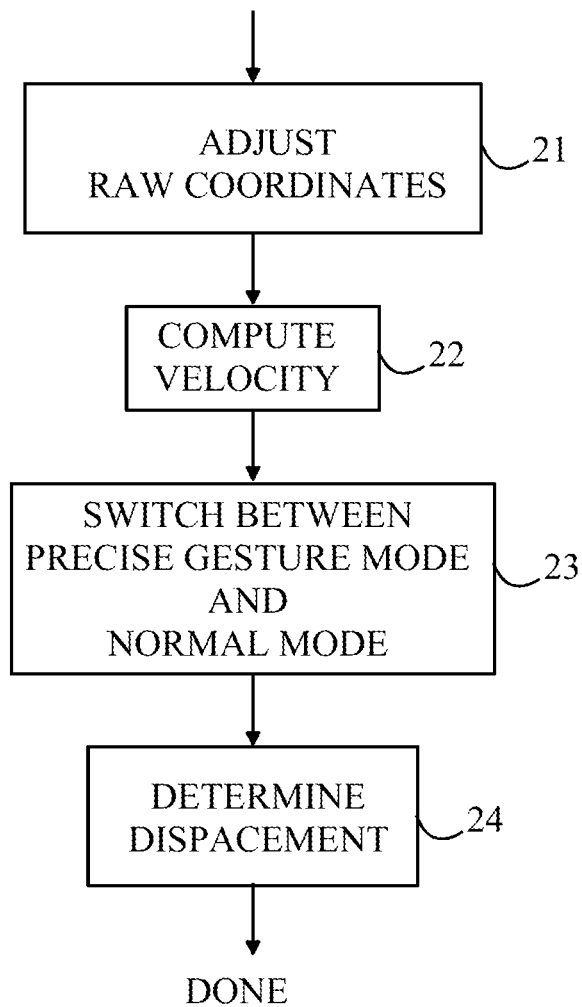
FIG. 2 illustrates a flow chart for one embodiment of a position tracking program for implementing a precise gesture according to the present invention.

Refer now to FIG. 2, which is a flow chart for one embodiment of a position tracking program for implementing a precise gesture according to the present invention. It is assumed that the user has already placed his or her finger on the display screen and begun to move it in a manner that signals a gesture that could be a precise gesture. Each time a new position of the user's finger on the display is detected, the raw data is input to a position computing module 21 that processes the new data. In this embodiment, position computing module 21 computes a new average velocity for the finger position using the exponential averaging scheme discussed above. The new position of the finger is used to compute an offset from the previous position computed by position computing module 21.

Next, a determination is made as to whether to switch modes from the normal mode to the precise gesture mode or from the precise gesture mode to the normal mode as shown at 23. It is assumed that the gesture started in the normal gesture mode. The details of this procedure will be discussed in more detail below. The gesture mode is reflected in a scaling factor K. In normal mode, K=1. In precise gesture mode K>1. In one aspect of the invention, K=4 in precise gesture mode.

Next, the displacements to be sent to the normal gesture processing software are determined as shown at 24. The displacements sent are the difference in positions between the current object position and the previous object position divided by K. If the gesture has switched from precise gesture mode to normal mode, the object position as perceived by the normal gesture processing software will continue to be displaced from the finger position values by an offset that represents the difference in these two coordinates at the time the change in mode occurred. When the gesture is completed, the gesture mode is returned to the normal mode if the gesture mode is still the precise gesture mode.

Figure 3:
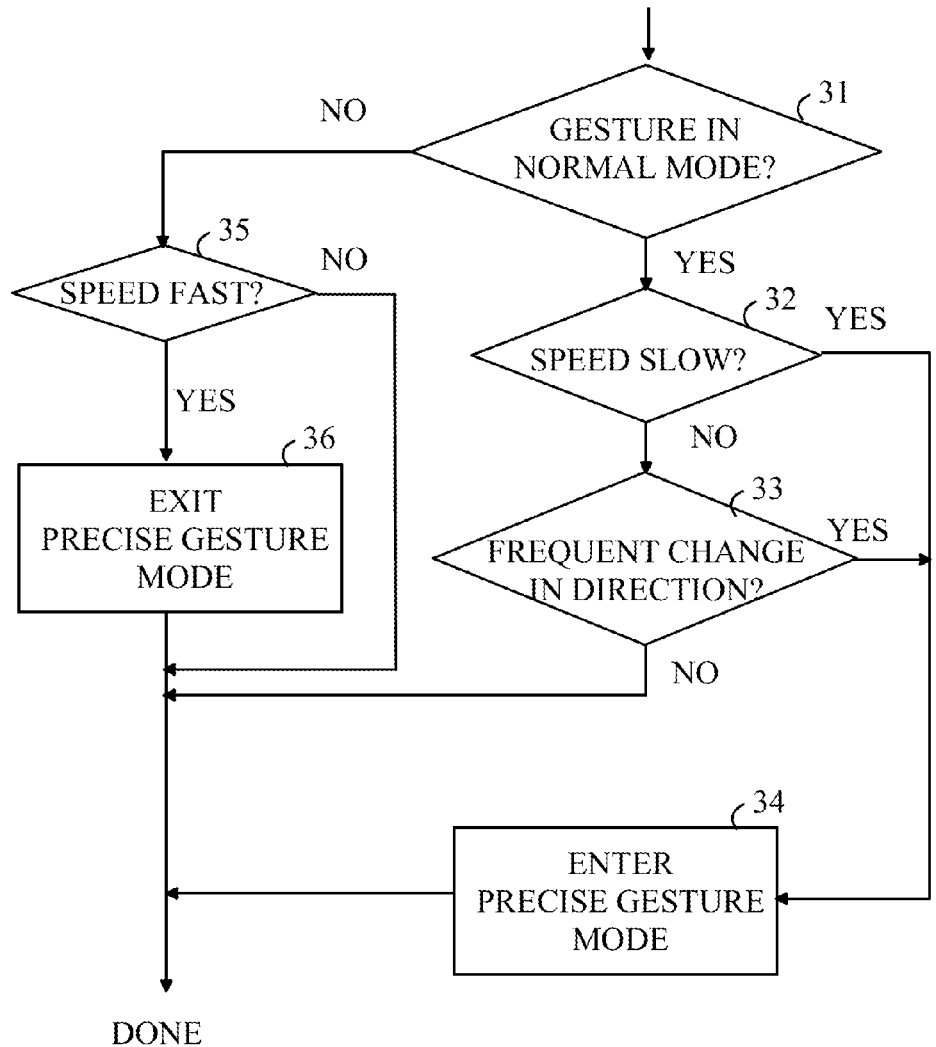
FIG. 3 illustrates a flow chart for one embodiment of a procedure for switching modes based on the user's finger motion.

As noted above, one important aspect of the present invention is the ability of the system to change back and forth between precise gesture mode and normal mode automatically based on the user's finger motion in executing the gesture during the gesture. That is, the mode changes without the user explicitly entering a command that causes the system to change modes. Refer now FIG. 3, which is a flow chart for one embodiment of a procedure for switching modes based on the user's finger motion. Initially, the system determines if the gesture mode is currently the normal gesture mode as shown at 31. If the current mode is the normal mode, the system tests the speed at which the user's finger is moving as shown at 32. If speed, i.e., the absolute value of the velocity, is less than or equal to a slow threshold value, the system enters the precise gesture mode as shown at 34.

If the speed is greater than the slow threshold, the system tests the direction of the user's finger as shown at 33. The system keeps track of the number of times the direction of motion of the user's finger changes during some predetermined number of position updates. If that number exceeds a direction threshold, the system enters precise gesture mode as shown at 34. If not, this phase of the method is completed.

When the system enters the precise gesture mode as shown at 34, the system records the current position of the user's finger and changes the scaling factor K to the higher value associated with precise gesture mode. The current position is saved to enable the system to determine the offset between the user's finger and the object position in cases in which the normal mode is entered again before the gesture terminates.

If the system is in precise gesture mode at step 31, the system tests the speed of the user's finger to determine if it is now greater than a predetermined reset threshold value as shown at 35. If not, the system exits and continues in precise gesture mode. If the user's finger speed is greater than the reset threshold, the system exits precise gesture mode as shown at 36. The system then uses the offset between the user's current finger position and the position at which the system entered precise gesture mode to determine the offset to be maintained between the object position and the user's finger position in the normal mode. This aspect of the invention provides a smooth transition between the normal mode and the precise gesture mode.

In one aspect of the invention, the reset threshold for switching between precise gesture mode and normal gesture mode is greater than the threshold for switching from normal gesture mode to precise gesture mode. In particular, the reset threshold is set such that the user must move his or her finger significantly faster than the speed with which the system switched from normal to precise gesture mode. This introduces a hysteresis into the switching so that the user must make a clearly "fast" movement to exit precise gesture mode.

The above-described embodiments utilize a drag operation as the gesture in which the precise gesture mode is operable. However, other gestures can utilize a precise gesture mode according to the present invention. For example, in pinch gestures, the change in the distance between the fingers is the parameter of interest. The speed with which this distance changes can be used to trigger entry into, and out of, precise gesture mode. Similarly, if the rate of change of the distance between the two fingers changes more than some predetermined number of times in a predetermined time period, precise gesture mode could be triggered. In one aspect of the invention, the speed with which the fingers move relative to one another is computed using an exponential average of the type discussed above.

The above-described embodiments of the present invention have utilized the position of the user's finger on the touch-enabled display. However, embodiments in which the contact object is a stylus or other object can also be constructed without departing from the teachings of the present invention. In addition, embodiments in which contact object is a virtual object such as provided by a mouse or other conventional pointer can be constructed.

The present invention also includes a computer readable medium that stores instructions that cause a data processing system to execute the method of the present invention. A computer readable medium is defined to be any medium that constitutes patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to implement a gesture on a display, said method comprising:
   causing said data processing system to determine a position of a contact object on said display as a function of time;
   causing said data processing system to provide an offset indicating a distance through which a point shown on said display is to be moved in response to said determined position, said offset having a first value in a normal mode and a second value in a precise gesture mode, said second value being less than said first value; and
   causing said data processing system to automatically change from said normal mode to said precise gesture mode in response to changes in said determined position as a function of time.

2. The method of claim 1 wherein said display is a touch enabled display.

3. The method of claim 1 wherein said data processing system determines a speed with which said contact object is moving on said display and wherein said data processing system changes to said precise gesture mode if said speed is less than or equal a slow threshold value.

4. The method of claim 1 wherein said data processing system determines a direction of motion of said contact object on said display as a function of time, and wherein said data processing system changes to said precise gesture mode if said direction of motion changes more than a predetermined number of times within a predetermined time period.

5. The method of claim 3 wherein said data processing system changes to said normal mode when a gesture being executed in said precise gesture mode terminates.

6. The method of claim 3 wherein said data processing system changes from said precise gesture mode to said normal mode if said determined speed is greater than a predetermined reset threshold value.

7. The method of claim 6 wherein said predetermined reset threshold value is greater than said slow threshold value.

8. The method of claim 1 wherein said determined position depends on an average value of a speed of said contact object over a plurality of previous determined positions.

9. The method of claim 8 wherein said average value is an exponential average of previous speeds of said contact object.

10. A computer readable medium comprising instructions that cause a data processing system having a display to execute a method for operating a display screen that is part of said data processing system, said method comprising:
- causing said data processing system to determine a position of a contact object on said display as a function of time;
- causing said data processing system to provide an offset indicating a distance through which a point shown on said display is to be moved in response to said determined position, said offset having a first value in a normal mode and a second value in a precise gesture mode, said second value being less than said first value; and
- causing said data processing system to automatically change from said normal mode to said precise gesture mode in response to changes in said determined position as a function of time.

11. The computer readable medium of claim 10 wherein said display is a touch enabled display.

12. The computer readable medium of claim 10 wherein said data processing system determines a speed with which said contact object is moving on said display and wherein said data processing system changes to said precise gesture mode if said speed is less than or equal a slow threshold value.

13. The computer readable medium of claim 10 wherein said data processing system determines a direction of motion of said contact object on said display as a function of time, and wherein said data processing system changes to said precise gesture mode if said direction of motion changes more than a predetermined number of times within a predetermined time period.

14. The computer readable medium of claim 12 wherein said data processing system changes to said normal mode when a gesture being executed in said precise gesture mode terminates.

15. The computer readable medium of claim 12 wherein said data processing system changes from said precise gesture mode to said normal mode if said determined speed is greater than a predetermined reset threshold value.

16. The computer readable medium of claim 15 wherein said predetermined reset threshold value is greater than said slow threshold value.

17. The computer readable medium of claim 10 wherein said determined position depends on an average value of a speed of said contact object over a plurality of previous determined positions.

18. The computer readable medium of claim 17 wherein said average value is an exponential average of previous speeds of said contact object.

* * * * *